(12) United States Patent
Takechi

(10) Patent No.: US 9,693,544 B2
(45) Date of Patent: Jul. 4, 2017

(54) DRAG DEVICE FOR A DUAL-BEARING REEL

(71) Applicant: Shimano Inc., Sakai, Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 386 days.

(21) Appl. No.: 14/518,447

(22) Filed: Oct. 20, 2014

(65) Prior Publication Data

US 2015/0129701 A1 May 14, 2015

(30) Foreign Application Priority Data

Nov. 8, 2013 (JP) .................................. 2013-232207

(51) Int. Cl.
*A01K 89/01* (2006.01)
*A01K 89/033* (2006.01)
*A01K 89/015* (2006.01)

(52) U.S. Cl.
CPC .......... *A01K 89/033* (2013.01); *A01K 89/018* (2015.05); *A01K 89/054* (2015.05)

(58) Field of Classification Search
CPC .. A01K 89/01; A01K 89/0123; A01K 89/015; A01K 89/018; A01K 89/033; A01K 89/051; A01K 89/057; A01K 89/059
See application file for complete search history.

(56) References Cited

U.S. PATENT DOCUMENTS

| | | | | |
|---|---|---|---|---|
| 5,192,036 A * | 3/1993 | Sato | ..................... | A01K 89/033 242/268 |
| 5,588,605 A * | 12/1996 | Yamaguchi | .......... | A01K 89/033 242/268 |
| 6,047,913 A * | 4/2000 | Yamaguchi | .......... | A01K 89/015 242/310 |
| 6,189,823 B1 * | 2/2001 | Kobayashi | ........... | A01K 89/015 242/312 |
| 2012/0056028 A1 * | 3/2012 | Kawasaki | ............ | A01K 89/033 242/267 |
| 2014/0339350 A1 * | 11/2014 | Uribe | ................... | A01K 89/033 242/297 |

FOREIGN PATENT DOCUMENTS

| | | |
|---|---|---|
| JP | 3-27427 Y2 | 6/1991 |
| JP | 5-21666 U | 3/1993 |
| JP | 7-15417 Y2 | 4/1995 |

(Continued)

Primary Examiner — Emmanuel M Marcelo
(74) Attorney, Agent, or Firm — Global IP Counselors, LLP

(57) ABSTRACT

The drag device is a device that regulates the relative rotation between a drive gear that interlocks with a spool and a drive shaft. The drag device includes a first drag member, a star drag, and a sound unit. The first drag member is configured to be integrally rotatable with the drive shaft, includes a pressing side configured to be pressed against the drive gear, and has a sound generating part on the pressing side. The star drag is configured to adjust a pressing force of the first drag member. The sound unit is configured to interlock with the drive gear, is disposed so as to face the sound generating part, and is configured to generate sound by interfering with the sound generating part by relative rotation between the drive gear and the drive shaft.

15 Claims, 7 Drawing Sheets

(56) References Cited

FOREIGN PATENT DOCUMENTS

| | | |
|---|---|---|
| JP | 7-26937 Y2 | 6/1995 |
| JP | 2553310 Y2 | 7/1997 |
| JP | 10-210904 A | 8/1998 |
| JP | 2000-308445 A | 11/2000 |
| JP | 2002-34407 A | 2/2002 |
| JP | 2003-284472 A | 10/2003 |
| JP | 3792834 B2 | 7/2006 |
| JP | 4402816 B2 | 11/2009 |
| JP | 2010-42 A | 1/2010 |

\* cited by examiner

DRAG DEVICE FOR A DUAL-BEARING REEL

CROSS-REFERENCE TO RELATED APPLICATIONS

This application claims priority to Japanese Patent Application No. 2013-232207 filed on Nov. 8, 2013, the entirety of which is hereby incorporated by reference in its entirety.

BACKGROUND OF THE INVENTION

Field of the Invention

The present invention relates to a drag device and, in particular, relates to a drag device for a dual-bearing reel that regulates the relative rotation between a drive gear that interlocks with a spool of a dual-bearing reel and a drive shaft.

Background Art

In conventional devices, a star drag-type drag device that brakes the rotation of the spool in the line releasing direction can be disposed in the periphery of the drive shaft of a dual-bearing reel. The drag device adjusts the torque that can be transmitted between the drive gear and the drive shaft to suppress the tensile force that is applied to the fishing line. The drag device comprises a drag adjustment part (a star drag) that is screwed to the drive shaft and a drag member that is integrally and rotatably mounted on the drive shaft across from the drive gear. The drag member that is disposed on the drag adjustment part side of the drive gear is indirectly pressed by the drag adjustment part and presses the drive gear. Meanwhile, the drive shaft is prevented from rotating in the line releasing direction by a one-way clutch. Additionally, the drive gear can mesh with a pinion gear that is integrally and rotatably coupled with the spool.

In the known prior art, a sounding function emits a notification sound when this type of drag device drag operates. That is, when the spool rotates in the line releasing direction against the drag force (refer, for example, the specification of U.S. Pat. No. 4,402,816). A conventional drag device comprises a sound generating ring that is integrally and rotatably mounted to the back surface of the drive gear (the surface away from the handle) and a sound unit that is disposed on a gear member that is disposed across from the sound generating ring and a ratchet wheel. The sound unit has a striking pin that is mounted so as to be freely movable back and forth relative to a cylindrical housing part that is disposed on the gear member. The gear member is disposed on the back surface side of the ratchet wheel. The striking pin can extend through the ratchet wheel and come into contact with the sound generating ring. The striking pin sounds the sound generating ring by repeatedly impacting the sound generating ring by the relative rotation of the drive gear and the gear member during the drag operation.

SUMMARY

In a conventional drag device that has a sounding function, the sound generating ring and the sound unit are disposed on the rear surface side of the drive gear. For this reason, the sound position is far from the outside surface of the dual-bearing reel; resulting in the generation of an unclear muffled sound during the drag operation. Accordingly, it is difficult to generate a loud sound in a conventional device.

The object of the present invention is to allow a dual-bearing reel drag device to generate a clear and loud sound during the drag operation.

The drag device for a dual-bearing reel according to the present invention is a device that regulates the relative rotation between a drive gear that interlocks with a spool and a drive shaft. The drag device for a dual-bearing reel comprises a drag member, a drag adjustment part, and a sound unit. The drag member is configured to be integrally rotatable with the drive shaft, includes a pressing side configured to be pressed against the drive gear, and has a sound generating part on the pressing side. The drag adjustment part is configured to adjust a pressing force of the drag member. The sound unit is configured to interlock with the drive gear, is disposed so as to face the sound generating part, and is configured to generate sound by interfering with the sound generating part by relative rotation between the drive gear and the drive shaft.

In this drag device for a dual-bearing reel, when a force that is stronger than the regulating force that is adjusted by the drag adjustment part is applied to the fishing line, the spool rotates in the line releasing direction, and the drag device is activated. When the drag device is activated, the drive shaft and the drive gear rotate relative to each other, and the sound unit interferes with the sound generating part to generate a sound. Here, since the sound generating part is disposed on the pressing side of the drag member that presses the drive gear, the sound position by the interference between the sound unit and the sound generating part is a position that is closer to the outside surface of the dual-bearing reel than the drive gear. For this reason, it is possible to generating a loud and clear sound when the drag device is activated.

The sound unit can also comprise a striking pin that is mounted to the pressing side of the drive gear so as to be freely movable back and forth with respect to the sound generating part and can impact the sound generating part, and a biasing member that elastically biases the striking pin toward the sound generating part. In this configuration, generating a crisp, clear sound is possible, since sound is generated by the striking pin that is elastically biased toward the sound generating part.

The sound generating part can comprise at least one impacted portion. In this configuration, sound is generated by the striking pin impacting the impacted portion by the relative rotation of the drive shaft and the drive gear.

The sound generating part can comprise a plurality of impacted portions that are disposed at intervals in the circumferential direction. In this configuration, a plurality of sounds is generated in one rotation of the relative rotation of the drive shaft and the drive gear. For this reason, a clear sound with more of a click feeling can be generated.

The drag member can comprise a drag plate that is integrally and rotatably mounted to the drive shaft and that can press the drive gear, and a sound generating ring that has a sound generating part. In this configuration, since the drag member is formed by two members, a drag plate for pressing the drive gear and a sound generating ring for emitting a sound during the drag operation, the sound generating ring is prone to vibration while making sound. For this reason, the sound generating ring can generate an even louder and clearer sound during the drag operation.

The drag plate can have an engagement portion that engages with the sound generating ring, and the sound generating ring can have an engaged portion that engages the drag plate. In this configuration, the drag plate and the sound generating ring can be integrally and rotatably coupled by engaging the engagement portion and the engaged portion.

A prescribed gap can be disposed between the engagement portion and the engaged portion. In this configuration, since a prescribed gap is between the engagement portion and the engaged portion, the sound generating ring is more prone to vibration while making sound and can generate an even louder and clearer sound.

The engagement portion can comprise a first engagement section that engages in the pressing direction and a second engagement section that engages in the circumferential direction, and the engaged portion can comprise a first engaged section that engages with the first engagement section and a second engaged section that engages with the second engagement section. In this configuration, the sound generating ring can be stopped by the engagement between the first engagement section and the first engaged section, and the sound generating ring can be integrally and rotatably coupled with the drag plate by the engagement between the second engagement section and the second engaged section.

The first engagement section can comprise a pressing part that protrudes in the pressing direction and a flange part that extends from the pressing part in the radial direction; the first engaged section can comprise a through-hole into which the pressing part can be inserted and that is smaller in diameter than the flange part. In this configuration, the pressing part of the drag plate can be inserted through the through-hole and can press the drive gear, and the flange part can stop the sound generating ring in the periphery of the through-hole.

The length of the pressing part in the pressing direction can be longer than the length of the through-hole in the pressing direction. In this configuration, since the length of the pressing part in the pressing direction is longer than the length of the through-hole, a gap can be formed between the drag plate in the pressing direction of the sound generating ring. Accordingly, the sound generating ring is prone to vibration while making sound and can generate an even louder and clearer sound during the drag operation.

The length of the pressing part in the pressing direction can be at least 0.1 mm longer than the length of the through-hole in the pressing direction. In this configuration, since the length of the pressing part is only slightly longer with respect to the length of the through-hole, there will not be an increase in size of the dual-bearing reel even if the length of the pressing part is made longer than the through-hole.

The second engagement section can be at least one engagement recess that is disposed in the circumferential direction of the drag plate, and the second engaged section can be an engagement protrusion that can engage with the engagement recess. In this configuration, the sound generating ring can be integrally and rotatably coupled with the drag plate with the concave-convex engagement.

The second engagement section can be a plurality of engagement recesses that are provided at intervals in the circumferential direction of the drag plate, and the second engaged section can be a plurality of engagement protrusions that can engage with the plurality of the engagement recesses. In this configuration, the sound generating ring can be securely coupled integrally and rotatably with the drag plate with the plurality of concave-convex engagements.

The length of the engagement protrusion in the circumferential direction can be shorter than the length of the engagement recess in the circumferential direction. In this configuration, since a gap in the circumferential direction is formed between the engagement protrusion and the engagement recess, the sound generating ring is more prone to vibration while making sound and can generate an even louder and clearer sound.

The length of the engagement protrusion in the circumferential direction is at least 0.1 mm shorter than the length of the engagement recess in the circumferential direction. In this configuration, since the gap between the engagement protrusion and the engagement recess in the circumferential direction is small, when the drag device is activated, the sound generating ring and the drive gear that interlocks with the sound unit will relatively rotate instantaneously. Accordingly, a sound will be instantaneously emitted when the drag device is activated.

According to the present invention, since the sound generating part is disposed on the pressing side of the drag member that presses the drive gear, the sound position by the interference between the sound unit and the sound generating part is a position that is closer to the outside surface of the dual-bearing reel than the drive gear. For this reason, it is possible to generate a loud and clear sound, when the drag device is activated.

BRIEF DESCRIPTION OF THE DRAWINGS

Referring now to the attached drawings which form a part of this original disclosure.

DETAILED DESCRIPTION OF THE EMBODIMENTS

Figure 1:
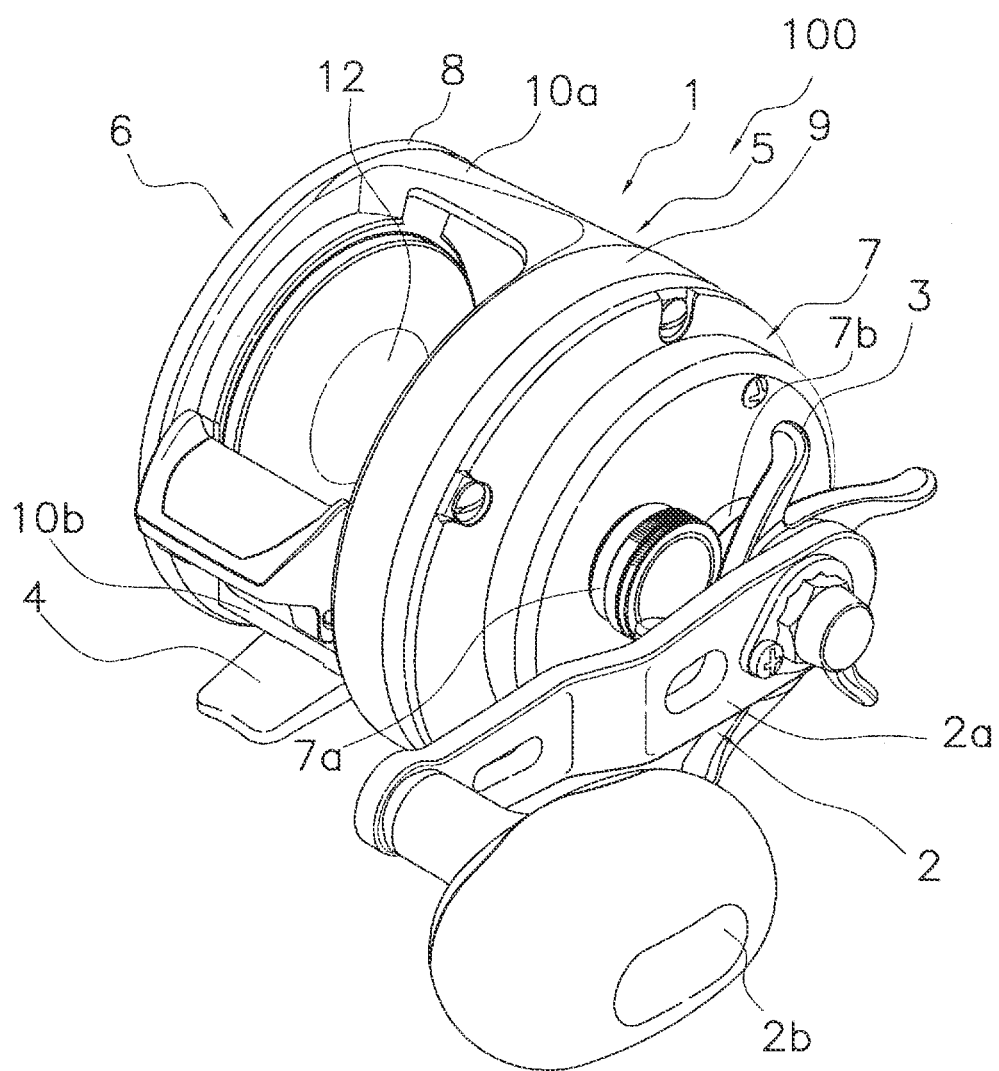
FIG. 1 is a perspective view of a dual-bearing reel employing a first embodiment of the present invention.
Figure 2:
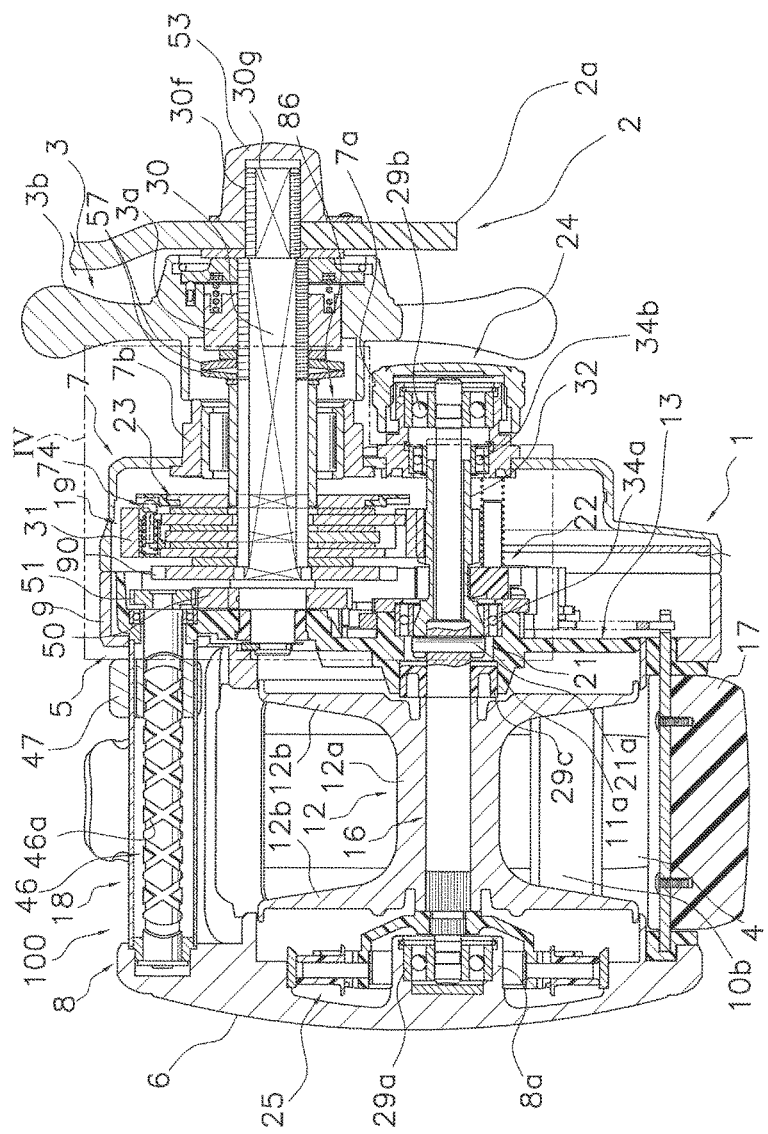
FIG. 2 is a cross-sectional view of the dual-bearing reel.

In FIG. 1 and FIG. 2, the dual-bearing reel 100 that employs one embodiment of the present invention comprises a reel body 1, a handle 2 for rotating the spool disposed on the reel body 1 side, a spool 12, and a drag device 23.

Schematic Configuration of the Dual-bearing Reel

The reel body 1 comprises a frame 5, a first side cover 6 that is mounted on both sides of the frame 5, a second side cover 7, and a mechanism mounting plate 13. The frame 5 comprises a first side plate 8 and a second side plate 9 that are disposed so as to face each other with a prescribed gap therebetween, and a front coupling portion 10*a* and a lower coupling portion 10*b* that couple the first side plate 8 and second side plate 9. A rod mounting leg portion 4 for mounting a fishing rod is integrally formed in the lower coupling portion 10*b*.

The first side cover 6 is roughly a circular shape when seen from axially outside of the spool, and the second side cover 7 is formed by two eccentric outer circumferences having different outer diameters. The first side cover 6 is, as shown in FIG. 2, integrally formed with the first side cover 8. The second side cover 7 is, for example, fixed to the second side plate 9 by three screws. The second side cover 7 comprises a first boss portion 7a for supporting a spool shaft 16 (discussed below) and a second boss portion 7b for supporting a drive shaft 30 (discussed below). The first boss portion 7a is disposed above and behind the second boss portion 7b. The mechanism mounting plate 13 is disposed so as to support the drive shaft 30 to which the handle 2 is integrally and rotatably coupled and the spool shaft 16. The mechanism mounting plate 13 is detachably mounted to the second side cover 7.

The handle 2 comprises, as shown in FIG. 1, a handle arm 2a that is integrally and rotatably mounted to the drive shaft 30 (refer to FIG. 2) and a handle grip 2b that is rotatably mounted to the distal end of the handle arm 2a. The handle arm 2a is disposed axially outside of a star drag 3 mentioned below.

As shown in FIG. 2, the spool 12, a clutch lever 17 that will be against the thumb, and a level winding mechanism 18 for uniformly winding the fishing line onto the spool 12 are disposed in the frame 5. A rotation transmission mechanism 19, a clutch mechanism 21, a clutch control mechanism 22, the drag device 23, and a casting control mechanism 24 are disposed between the frame 5 and the second side cover 7. Additionally, a centrifugal brake mechanism 25 for suppressing backlash when casting is disposed between the frame 5 and the first side cover 6.

The rotation transmission mechanism 19 transmits the torque from the handle 2 to the spool 12 and the level winding mechanism 18. The clutch mechanism 21 is disposed in the middle of the rotation transmission mechanism 19 and connects and disconnects the drive shaft 30 and the spool 12. The clutch control mechanism 22 controls the connecting and the disconnecting of the clutch mechanism 21 in response to the operation of the clutch lever 17. The casting control mechanism 24 adjusts the resistance of the spool 12 during rotation.

The spool 12 is integrally and rotatably coupled to the spool shaft 16 that extends through the center. The spool 12 comprises a spool body 12a onto which the fishing line is wound and a pair of large-diameter flange parts 12b that are integrally formed on both sides of the spool body 12a. The spool shaft 16 is rotatably supported by the reel body 1 by three axle bearings 29a, 29b, and 29c.

The clutch lever 17 is disposed behind the spool 12 in the rear part between a pair of first side plate 8 and second side plate 9. The clutch lever 17 slides in the vertical direction between the first side plate 8 and the second side plate 9.

The level winding mechanism 18 is disposed between the first side plate 8 and the second side plate 9 in front of the spool 12. The level winding mechanism 18 comprises a screw shaft 46 in which a spiral groove 46a that intersects the outer peripheral surface is formed, and a fishing line guide portion 47 that is reciprocally moved in the spool shaft direction by the screw shaft. The two ends of the screw shaft 46 are rotatably supported by the first side plate 8 and the second side plate 9.

Configuration of the Rotation Transmission Mechanism

The rotation transmission mechanism 19 comprises, as shown in FIG. 2, the drive shaft 30, a drive gear 31 that is fixed to the drive shaft 30, a cylindrical pinion gear 32 that meshes with the drive gear 31, a first gear member 50 that is integrally and rotatably mounted to the proximal end portion of the drive shaft 30, and a second gear member 51 that is non-rotatably mounted to the right end of the screw shaft 46 in FIG. 2.

Figure 3:
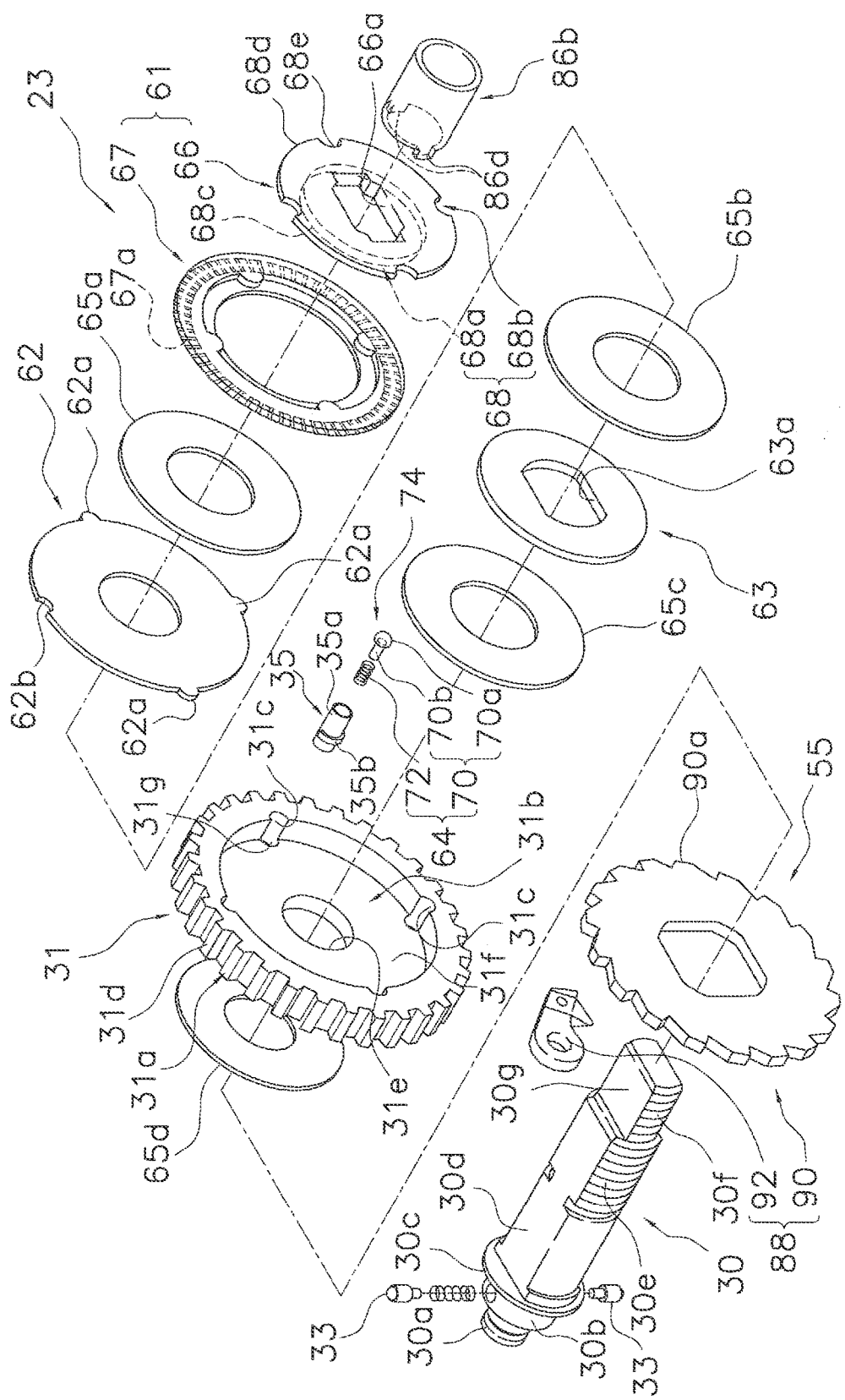
FIG. 3 is an exploded perspective view of the drag device.
Figure 4:
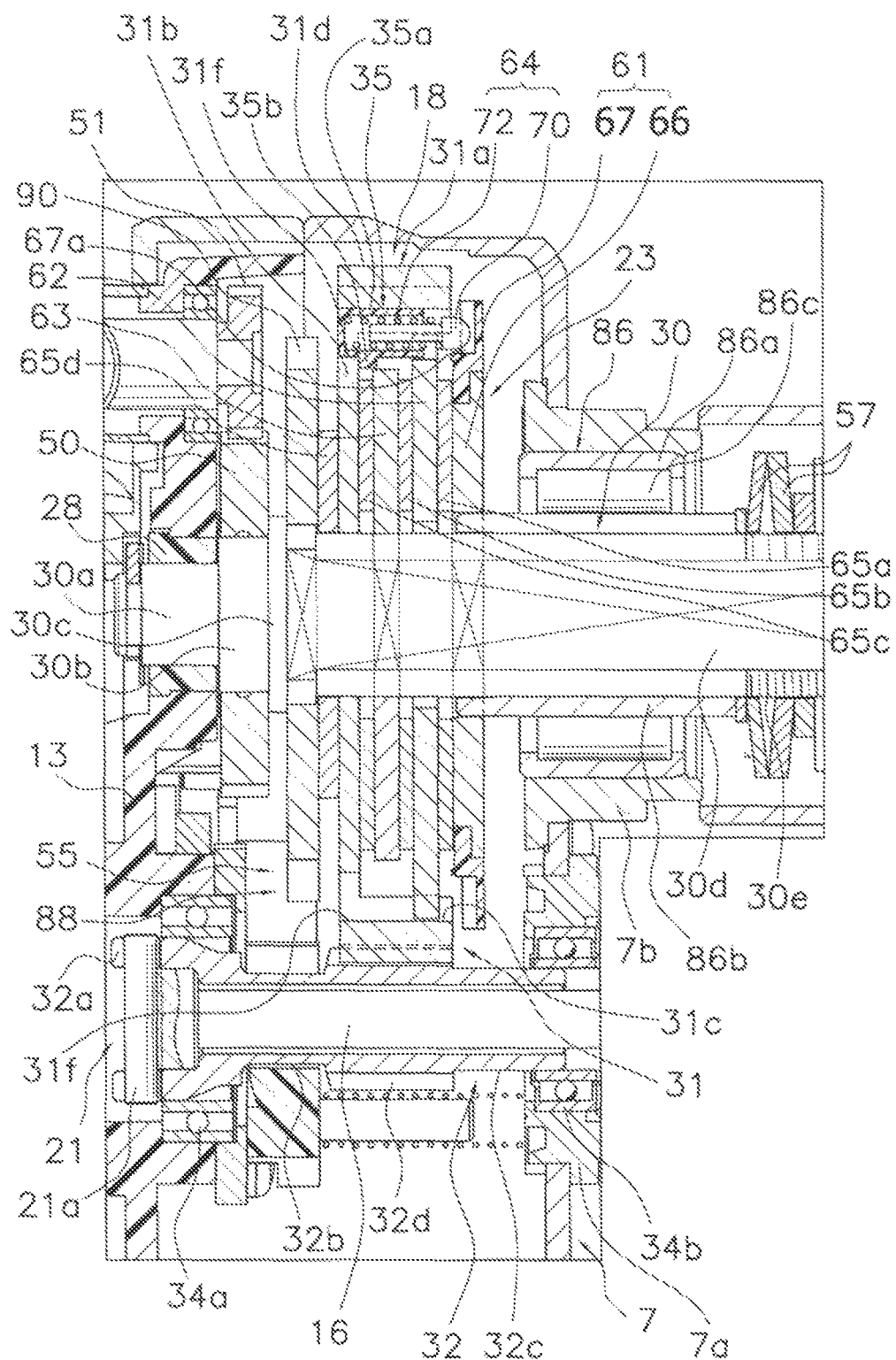
FIG. 4 is a sectional enlarged view of the IV part in FIG. 2.

The drive shaft 30 is, as shown in FIG. 4, prevented from rotating (reverse rotation) in the line releasing direction by a reverse rotation prevention mechanism 55. Accordingly, the drag device 23 becomes operable. The reverse rotation prevention mechanism 55 comprises a roller-type first one-way clutch 86 and a claw-type second one-way clutch 88. The first one-way clutch 86 is disposed in the middle portion of the drive shaft 30 and is mounted to the second side cover 7 of the reel body 1 in the gap between the second boss portion 7b and the drive shaft 30. The first one-way clutch 86 is an inner ring idling-type roller clutch. The first one-way clutch 86 comprises an outer ring 86a that is non-rotatably mounted to the second boss portion 7b, an inner ring 86b that is integrally and rotatably coupled with the drive shaft 30, and a roller 86c that is disposed between the outer ring 86a and the inner ring 86b. A pair of engagement projections 86d is disposed on the inner ring 86b, as shown in FIG. 3. The pair of engagement projections 86d is formed axially protruding from the end surface of the inner ring 86b on the drive gear 31 side and is integrally and rotatably coupled with the drag plate 66 of a first drag member 61 discussed below. In this embodiment, the inner ring 86b is integrally and rotatably coupled with the drive shaft 30 via the drag plate 66.

The second one-way clutch 88 comprises, as shown in FIG. 3, a ratchet wheel 90 that has ratchet teeth 90a on the outer periphery and a ratchet pawl 92 that is pivotally mounted to the outer side surface of the mechanism mounting plate 13 of the reel body 1. The ratchet wheel 90 is disposed to a first locking portion 30d of the drive shaft 30 while making contact with the flange part 30c and is integrally rotatable with the drive shaft 30. With the ratchet pawl 92 catching the ratchet teeth 90a, the rotation of the drive shaft 30 in the line releasing direction is prevented. A drag disc 65d of the drag device 23 is disposed between the ratchet wheel 90 and the drive gear 31. The ratchet wheel 90 also functions as a drag member that is integrally rotatable with the drive shaft 30.

The drive shaft 30 is, as shown in FIG. 4, rotatably supported by the second side cover 7 and the frame 5 by the axle bearing 28 and the first one-way clutch 86. As shown in FIG. 3 and FIG. 4, from the proximal end side to the distal end side of the drive shaft, a supported portion 30a, a torque regulating part 30b, a flange part 30c, a first locking portion 30d, a first male threaded portion 30e, a second male threaded portion 30f (refer to FIG. 3), and a second locking portion 30g (refer to FIG. 3) are formed,.

An axle bearing 28 for rotatably supporting the drive shaft 30 (refer to FIG. 4) is mounted to the supported portion 30a. The torque regulating portion 30b is larger in diameter than the supported portion 30a. The torque regulating portion 30b integrally and rotatably couples the first ear member 50 to the drive shaft 30 within the allowable torque with a pair of regulating pins 30 that are biased radially outward. The flange part 30c is larger in diameter than the torque regulating portion 30b. The flange part 30c is disposed so as to receive the pressing force that is generated by the drag device 23. The first locking portion 30d is disposed to integrally and rotatably couple a first drag member 61, a second drag member 62, and a ratchet wheel 90 that configure the drag device 23 (each discussed below) to the drive shaft 30. The first locking portion 30d is smaller in diameter than the flange part 30c and is formed by two sets of chamfered portions that are parallel to each other. The first male threaded portion is disposed so as to screw the star drag 3 of the drag device 23. The first male threaded portion 30e is formed on the outer peripheral surface of the distal end side of the first locking portion 30d, excluding the first locking portion 30d. The second male threaded portion 30f is formed on the distal end portion of the drive shaft 30 to be smaller in diameter than the first male threaded portion 30e. The second locking portion 30g is smaller in diameter than the first locking portion 30d and is formed by a set of chamfering portions that are parallel to each other. The second locking portion 30g is formed on the outer peripheral surface of the drive shaft 30 where the second male threaded portion 30f is formed. The second locking portion 30g is disposed so as to integrally and rotatably couple the handle 2. The handle 2 is integrally and rotatably fixed to the drive shaft 30 by a nut 53 (refer to FIG. 2) that is screwed to the second male threaded portion 30f.

The drive gear 31 is rotatably mounted to the drive shaft 30 and is coupled to the drive shaft 30 via the drag device 23. The drive gear 31 comprises a cylindrical gear part 31a, a disc part 31b that has a thinner wall than the gear part 31a, and at least one first engagement recess 31c that is formed on the inner peripheral surface of the gear part 31a. In this embodiment, the first engagement recess 31c is recessed in a circular arc shape on the inner peripheral part of the gear part 31a, and a plurality (for example two to six, four in this embodiment) of them are formed. The gear part 31a comprises gear teeth 31d that are formed on the outer peripheral side of the drive gear 31. The disc part 31b is integrally formed on the inner peripheral side of the gear part 31a and is rotatably mounted to the drive shaft 30. The disc part 31b is thinner walled than the gear part 31a. A supporting hole 31e that is supported by the drive shaft 30 is formed in the center of the disc part 31b. The disc part 31b also comprises a pressing side 31f that is pressed by the drag device 23 on the handle 2 side. The first engagement recess 31c is disposed so as to integrally and rotatably couple the second drag member 62 to the drive gear 31. The first engagement recess 31c is formed extending through to the surface away from the second side cover 7 of the drive gear 31, and a circular mounting hole 31g is formed on the penetrating portion.

The drive gear 31 further comprises a housing part 35 that houses a sound unit 64 of the drag device 23 mentioned below. The housing part 35 comprises a bottomed cylindrical housing part main body 35a and a positioning protrusion 35b that protrudes in a circular arc shape on the outer peripheral surface of the housing part main body 35a. The housing part main body 35a can be engaged with the mounting hole 31g and the first engagement recess 31c and is movable in the axial direction. A sound unit 64 is housed in the housing part main body 35a. When the housing part main body 35a is mounted in the mounting hole 31g, the back surface of the positioning protrusion 35b that is axially disposed (the surface away from the handle 2) makes contact with the wall surface of the disc part 31b in the periphery of the mounting hole 31g; both surfaces in the circumferential direction make contact with the inner peripheral surface of the gear part 31a. Accordingly, the axial positioning and rotational stop of the housing part main body 35a is carried out. Meanwhile, the housing part 35 can be mounted to any of the four mounting holes 31g.

The pinion gear 32 is, as shown in FIG. 2, a cylindrical member that extends from the outside of the second side plate 9 inward and through the center of which extends through the spool shaft 16. The pinion gear 32 is supported by the reel body 1 in order to be movable in the axial direction as well as rotatably by the axle bearing 34a and the axle bearing 34b. The axle bearing 34a is mounted to the mechanism mounting plate 13. The axle bearing 34b is mounted to the first boss portion 7a of the second side cover 7. As shown in FIG. 4, in the left end portion of the pinion gear 32 in FIG. 4, a meshing groove 32a is formed that meshes with an engagement pin 21a of the clutch mechanism 21 discussed below. The clutch mechanism 21 is formed by this meshing groove 32a and the engagement pin 21a that is mounted to the spool shaft 16. Additionally, a constricted portion 32b is formed in the middle portion, and a support portion 32c that is supported by the axle bearing 34b is formed in the right end portion of the pinion gear 32. A gear part 32d that meshes with the drive gear 31 is formed between the constricted portion 32b and the support portion 32c.

The first gear member 50 is, as mentioned above, mounted to the torque regulating portion 30b of the drive shaft 30. The first gear member 50 runs idle when the screw shaft 46 or the second gear member 51 is for some reason non-rotatable and when torque exceeding the allowable torque acts on the first gear member 50. The first gear member makes contact with the flange part 30c from the proximal end portion side of the drive shaft 30. The second gear member 51 that is mounted to the screw shaft 46 meshes with the first gear member 50. In this configuration, the screw shaft 46 of the level winding mechanism 18 rotates in conjunction with the rotation of the drive shaft 30 in the line winding direction.

Configuration of the Drag Device

The drag device 23 regulates the relative rotation between the drive gear 31 that interlocks with the spool 12 and the drive shaft 30 until a prescribed amount of torque has been exceeded. The drag device 23 also applies a brake to the rotation of the spool 12 in the line releasing direction when the drive gear 31 and the drive shaft 30 relatively rotate exceeding the prescribed amount of torque. The drag device 23 mainly comprises a star drag 3 shown in FIG. 2, a first drag member 61 shown in FIG. 3 and FIG. 4, a second drag member 62, a third drag member 63, a sound unit 64, and a plurality of (for example, 4) drag discs 65a to drag discs 65d. The first drag member 61 is one example of a drag member.

As shown in FIG. 2, the star drag 3 comprises a nut member 3a that is screwed to the first male threaded portion of the drive shaft 30, and a main body member 3b that supports the nut member 3a integrally and rotatably, as well as movably, in the axial direction. The star drag 3 is one example of a drag adjustment part. The star drag 3 is a member that presses a member mounted to the drive shaft 30 further to the proximal end side than the star drag 3 (for example, members such as the inner ring 86b of the first one-way clutch 86, the first drag member 61, the second drag member 62, or the third drag member 63) to adjust the prescribed amount of torque. A plurality of disc springs 57 (for example, two to six but two in this embodiment) are mounted between the star drag 3 and the first one-way clutch 86. The disc spring 57 is disposed to gently transmit the clamping force of the star drag 3 to the first drag member 61. The disc spring 57 makes contact with the star drag 3 and the inner ring 86b of the first one-way clutch 86 each via a washer.

By adjusting the tightness, the star drag 3 can move the inner ring of the first one-way clutch 86 that is mounted to the second side cover 7 in the axial direction via the disc spring 57. That is, the pressing force of the disc spring 57 is adjusted by adjusting the star drag 3. In this configuration, the drag force of the drag device 23 can be finely adjusted with the star drag 3.

The first drag member 61 is, as shown in FIG. 3 and FIG. 4, integrally rotatable with the drive shaft 30 and is pressed to the drive gear 31 by the inner ring 86b of the first one-way clutch 86. The first drag member 61 comprises a sound generating part 67a that is formed on the pressing side with respect to the drive gear 31. The first drag member 61 is integrally and rotatably mounted to the drive shaft 30. The first drag member 61 comprises a drag plate 66 that can press the drive gear 31 and a sound generating ring 67 that has the sound generating part 67a. The drag plate 66 is integrally and rotatably mounted on the first locking portion 30d of the drive shaft 30. The sound generating ring 67 is mounted on the outer peripheral side of the drag plate 66 in order to be integrally rotatable with the drag plate 66.

Figure 5:
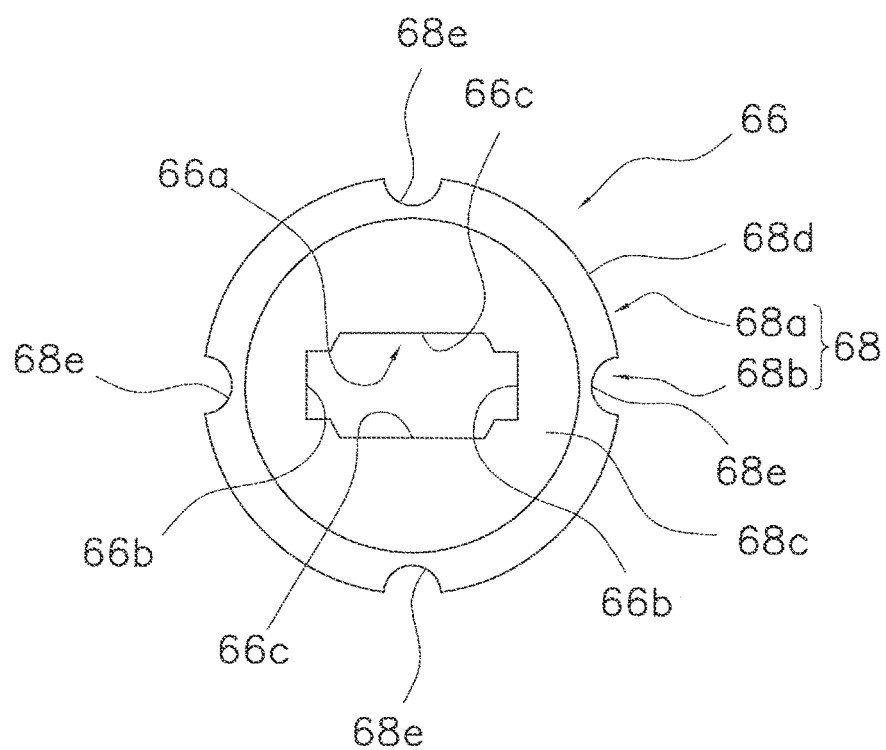
FIG. 5 is a frontal view of a first drag member as seen from the drive gear side.
Figure 6:
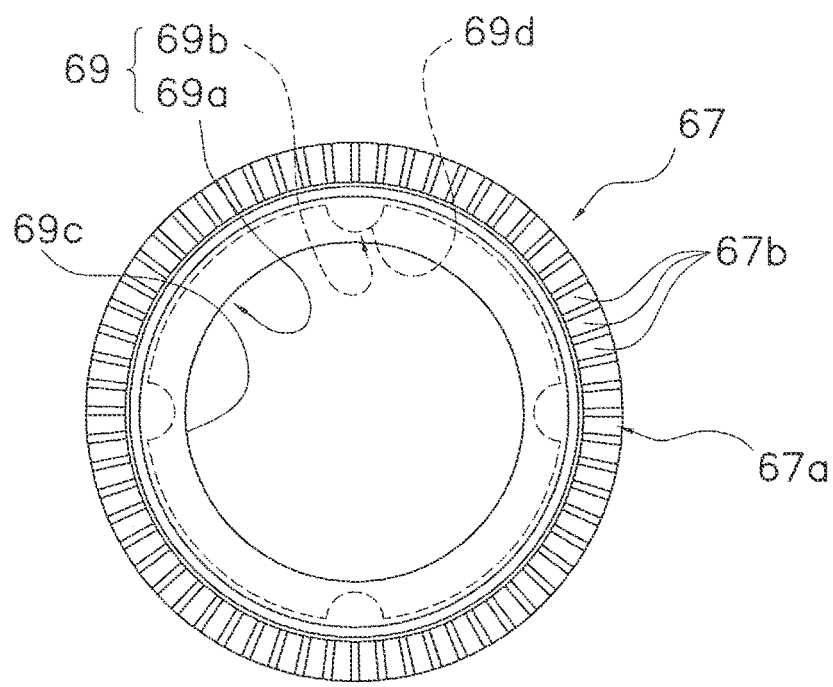
FIG. 6 is a frontal view of a second drag member as seen from the drive gear side.

The drag plate 66 is, as shown in FIG. 3 and FIG. 5, a disc-shaped member. The drag plate 66 comprises and engagement portion 68 that is formed on the outer peripheral part and that engages the sound generating ring 67, and a noncircular hole 66a that is formed in the inner peripheral part. The noncircular hole 66a integrally and rotatably engages with the pair of engagement projections 86d of the inner ring 86b of the first one-way clutch 86. The noncircular hole 66a comprises a pair of rectangular recesses 66b that engage the pair of engagement projections 86d of the inner ring 86b and a pair of straight portions 66c that engage with the first locking portion 30d of the drive shaft 30.

The engagement portion 68 comprises a first engagement section 68a that engages the sound generating ring 67 in the pressing direction in which the drive gear 31 is pressed (the left direction of the drive shaft in FIG. 3) and a second engagement section 68b that engages the sound generating ring 67 in the circumferential direction. The first engagement section 68a comprises a pressing part 68c that protrudes in the pressing direction and a flange part 68d that extends radially from the outer peripheral side of the pressing part 68c. The second engagement section 68b comprises at least one second engagement recess 68e that is disposed at an interval in the circumferential direction of the flange part 68d of the drag plate 66. The second engagement recess 68e is one example of an engagement recess of the second engagement section.

Figure 7:
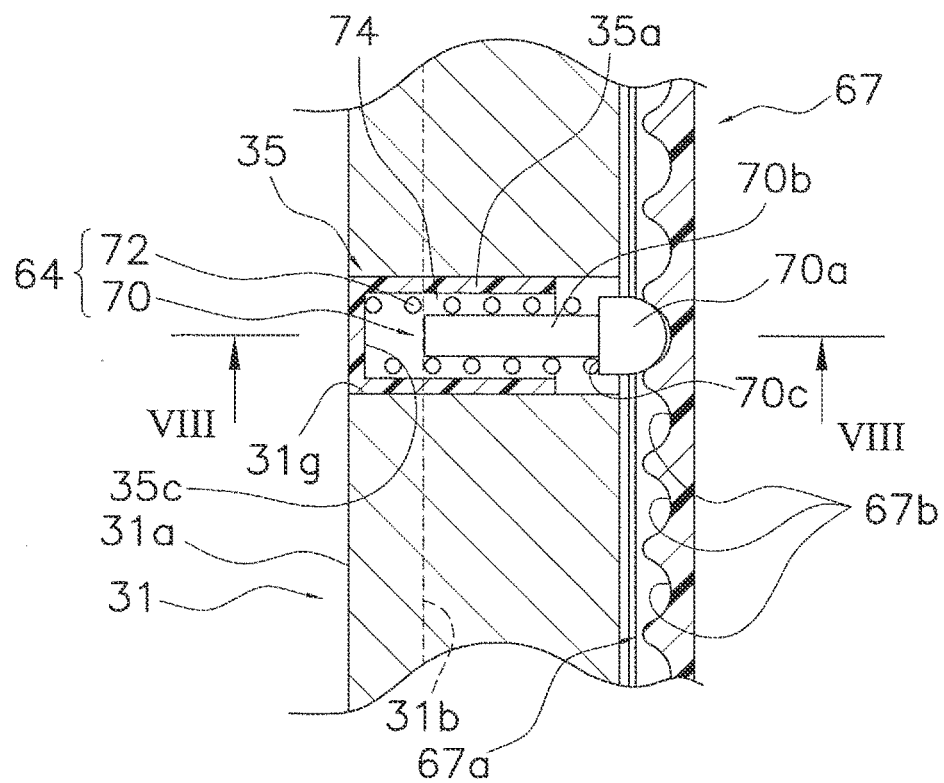
FIG. 7 is a cross-sectional view of the drive gear and the striking pin mounting portion of the sound generating ring.

The sound generating ring 67 is a synthetic resin member made of, for example, a polyamide resin, a polyphenylene sulfide resin, etc. that has been reinforced by a filler such as glass fiber or carbon fiber. In this embodiment, a polyphenylene sulfide resin was chosen. The sound generating ring 67, as shown in FIG. 3, FIG. 6, FIG. 7, and FIG. 8, comprises the sound generating part 67a and an engaged portion 69 that engages with the engagement portion 68 of the drag plate 66 on a surface that can face the drive gear 31. The sound generating part 67a comprises a plurality of sound generating recesses 67b that are formed at intervals in the circumferential direction. The sound generating recess 67b is one example of an impacted portion. In this embodiment, the sound generating recesses 67b are, as shown in FIG. 7, formed at equal intervals in a recessed in a wave shape.

A prescribed gap is disposed between the engaged portion 69 and the engagement portion 68. The engaged portion 69 comprises a first engaged section 69a that engages with the first engagement section 68a and a second engaged section 69b that engages with the second engagement section 68b. The first engaged section 69a comprises a through-hole 69c into which the pressing part 68c can be inserted and that is smaller in diameter than the flange part 68d. The second engaged section 69b comprises a second engagement protrusion 69d that engages with the second engagement recess 68e of the drag plate 66. The second engagement protrusion 69d is one example of an engagement protrusion of the second engaged section.

Figure 8:
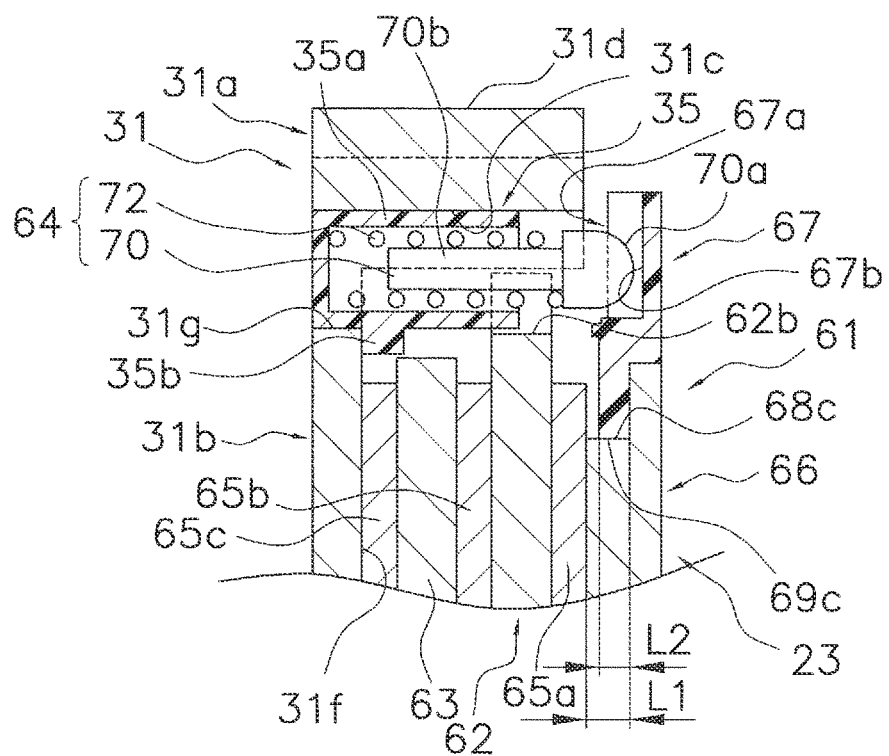
FIG. 8 is a cross-sectional view taken along the section line VIII-VIII in FIG. 7.

As shown in FIG. 8, the length L1 of the pressing part 68c in the pressing direction is longer than the length L2 of the through-hole 69c in the pressing direction. In particular, the length L1 of the pressing part 68c is at least 0.1 mm longer than the length L2 of the through-hole 69c. Meanwhile, in FIG. 8, the length L2 of the through-hole 69c appears shorter than the actual length in order to make the gap easily recognizable. Accordingly, the sound generating ring 67 can move in the axial direction with respect to the drag plate 66 by an amount corresponding to the gap between the two, which is the difference between the lengths L1-L2.

Figure 9:
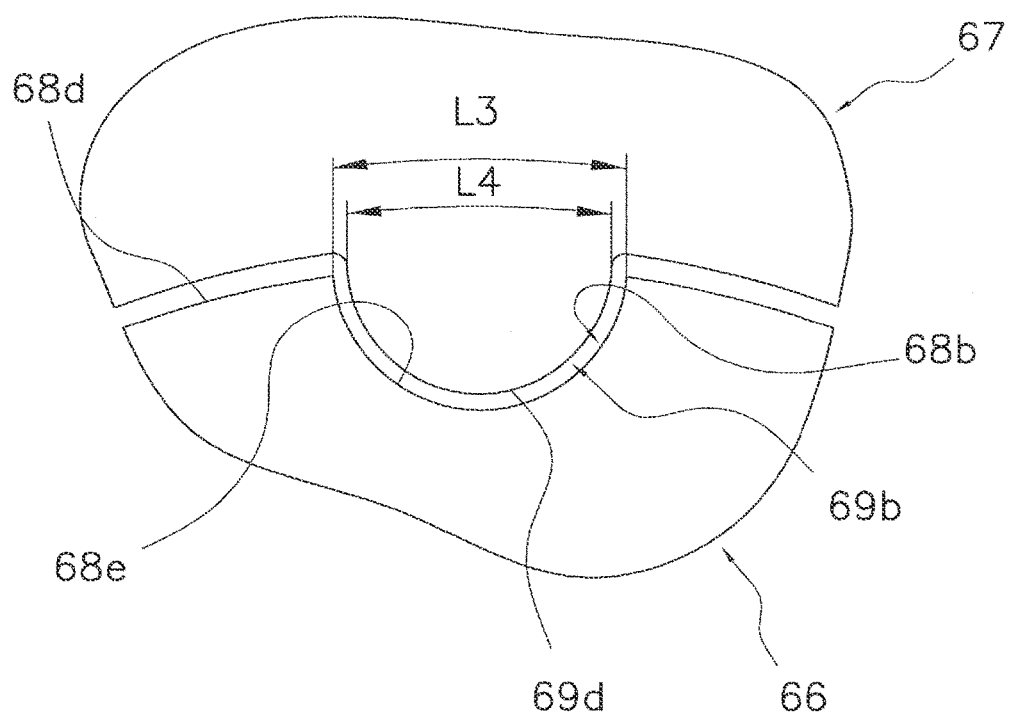
FIG. 9 is a schematic diagram showing the length of a first engagement recess of the drag plate in the circumferential direction and the length of the first engagement protrusion of the sound generating ring in the circumferential direction.

As shown in FIG. 9, the length L4 of the sound generating ring 67 in the circumferential direction of the second engagement protrusion 69d is shorter than the length L3 of the drag plate 66 in the circumferential direction of the second engagement recess 68e. Specifically, the length L4 of the engagement protrusion 69d in the circumferential direction is at least 0.1 mm shorter than the length L1 of the engagement recess 68e in the circumferential direction. In FIG. 9, the length IA of the second engagement protrusion 69d appears shorter than the actual length in order to make the gap easily recognizable. Accordingly, the sound generating ring 67 can move in the circumferential direction with respect to the drag plate 66 by an amount corresponding to the gap between the two in the circumferential direction, which is the difference between the lengths L3 -L4.

The second drag member 62 is, as shown in FIG. 3 and FIG. 4, disposed between the first drag member 61 and the third drag member 63. The second drag member 62 is disposed on the inner peripheral side of the gear part 31a of the drive gear 31 and is integrally and rotatably provided with the drive gear 31. The second drag member 62 is pressed by the pressing part 68c of the drag plate 66 of the first drag member 61 via the drag disc 65a. The second drag member 62 comprises at least one first engagement protrusion 62a that engages with the plurality of first engagement recesses 31c of the drive gear 31 on the outer peripheral part. The number of first engagement protrusions 62a is preferably smaller than the number of first engagement recesses 31c. In this embodiment, the number of the first engagement recesses 31c is four, and the number of the first engagement protrusions 62a is three. Additionally, the second drag member 62 comprises a passage recess 62h on the outer peripheral part, through which the sound unit 64 can pass. In a state in which the first engagement protrusions 62a are engaged with the first engagement recesses 31c, the passage recess 62b is disposed in a position that can face the remaining first engagement recesses 31c. Therefore, in an embodiment in which the first engagement recesses 31c are disposed at equal intervals, a plurality of first engagement protrusions 62a and at least one passage recess 62b are disposed at equal intervals. The passage recess 62b is formed recessed so that the sound unit 64 that is housed in the housing part 35 can pass through the recess.

The third drag member 63 is disposed between the second drag member 62 and the drive gear 31. The third drag member 63 is pressed by the second drag member 62 via a drag washer 65b. The third drag member 63 is disposed on the inner peripheral side of the gear part 31a of the drive gear 31 and comprises a noncircular hole 63a that integrally and rotatably engages with the first locking portion 30d of the drive shaft 30 on the inner peripheral side via the drag disc 65. The third drag member 63 presses the disc part 31b of the drive gear 31 via the drag disc 65c.

The sound unit 64 comprises, as shown in FIG. 7 and FIG. 8, a striking pin 70 and a biasing member 72 that biases the striking pin 70. The striking pin 70 is mounted to be freely movable back and forth on the housing part 35 that is mounted to the pressing side 31f that is pressed by the drag device 23 of the drive gear 31, with respect to the sound generating part 67a of the first drag member 61. The biasing member 72 elastically biases the striking pin toward the sound generating part 67a.

The striking pin 70 is a metallic member that can repeatedly impact the sound generating part 67a. The striking pin 70 comprises a head portion 70a with a large diameter at the distal end and a shaft portion 70b that is integrally formed on the proximal end of the head portion 70a. The head portion 70a is formed in a bullet shape, and the distal end portion is, for example, rounded to be spherical. The head portion is a size that can engage the sound generating recess 67b. Specifically, this is a size that can enter into the sound generating recess 67b. The head portion 70a is disposed protruding from the housing part 35. The shaft portion 70b is smaller in diameter than the head portion 70a and is disposed so as to engage the biasing member 72.

The biasing member 72 is a coil spring that is disposed on the outer peripheral side of the shaft portion 70b of the striking pin 70. The biasing member 72 is disposed in a compressed state between the step 70c between the bottom surface 35c of the housing part 35 and the head portion 70a and the shaft portion 70b of the striking pin 70.

The sounding mechanism 74 is formed by this sound unit 64 and the sound generating part 67a. The striking pin 70 that is biased toward the sound generating part 67a by the biasing member 72 biases the first drag member 61 to the handle 2 side in an assembled state.

The drag disc 65a to drag disc 65d are, for example, formed by members such as felt, carbon, etc.

In this configuration, the striking pin rotates in conjunction with the drive gear 31, and the drive shaft 30 and the first drag member 61 are prevented from reverse rotation by the reverse rotation prevention mechanism 55. Therefore, when the drive shaft 30 and the drive gear 31 rotate relatively with the operation of the drag device 23, the striking pin 70 repeatedly impacts the sound generating part 67a of the first drag member 61 and emits a sound. At this time, since the sound generating ring 67 emits a sound in a position close to the second side cover 7 to which is disposed the sound generating ring 67, when the drag device 23 operates, it is possible to generate a loud and clear sound.

Next, the operation of this dual-bearing reel will be explained.

When winding the fishing line, the handle 2 is turned in the line winding direction. The rotation of the handle 2 is transmitted from the drive shaft 30 to the drive gear 31 that is interlocked with the drive shaft 30 and the pinion gear 32 via the drag device 23. The rotation of the pinion gear 32 is transmitted to the spool shaft 16 that is fitted with the pinion gear 32 by the clutch mechanism 21, and the spool 12 rotates and winds the fishing line. This rotation of the drive shaft 30 is also transmitted to the screw shaft 46 via the first gear member 50 and the second gear member 51. With the rotation of the screw shaft 46, the fishing line guiding part 47 of the level winding mechanism 18 reciprocally moves along the spool shaft 16. With this reciprocating motion, the fishing line is substantially uniformly wound on the spool 12.

On the other hand, when releasing the fishing line, the clutch lever 17 is operated, and the clutch mechanism 21 is put in a detaching state (the clutch off state) by the clutch control mechanism 22. In this embodiment, the engagement between the spool shaft 16 and the pinion gear 32 is released; even if the spool 12 rotates due to the release of the fishing line, the rotation is not transmitted to the rotation transmission mechanism 19 or the drive shaft 30.

Next, the operation of the drag device 23 will be explained.

When catching a fish, tension is applied to the fishing line. In this configuration, the torque that tries to rotate in the line releasing direction acts on the spool 12. However, since the drive gear 31 is pressed to the ratchet wheel 90 side by the disc spring 57 that is compressed by the tightening of the star drag 3, as long as the torque that acts on the spool 12 is small, the drive gear 31 and the drive shaft 30 are relatively non-rotatable. Since the drive shaft 30 is stopped by the reverse rotation prevention mechanism 55 so as not to rotate in the line releasing direction, the spool 12 that is interlocked with the drive gear 31 will also not rotate in the line releasing direction.

When the tension on the fishing line increases and the torque applied to the spool 12 becomes large, the drive gear 31 and the second drag member 62 will rotate in the line releasing direction while slipping with respect to the first drag member 61, the third drag member 63, and the ratchet wheel 90. Accordingly, the spool 12 will also rotate in the line releasing direction. Thus, when the torque that acts on the spool 12 exceeds a prescribed value, in other words, when excessive tensile force is applied to the fishing line, the drag device 23 is activated, and the spool 12 rotates in the line releasing direction to protect the fishing line from the excessive tensile force.

When the spool 12 rotates in the line releasing direction when catching a fish, as described above, a sound is generated by the sounding mechanism 74. When the drive shaft 30 and the drive gear 31 rotate relatively, the sound generating recess 67b of the first drag member 61 that rotates in conjunction with the drive shaft 30 and the striking pin 70 that rotates in conjunction with the drive gear 31 will interfere with each other and will generate a clicking sound. This clicking sound is generated by the head portion 70a of the striking pin 70 that is biased toward the sound generating recesses 67b that are disposed at equal intervals, making contact intermittently. For this reason, the clicking sound is a rhythmic sound. When this sound is generated, since the first drag member 61 that has the sound generating part 67a is disposed in a position near the second side cover 7 and emits a sound in a position near the outer side of the dual-bearing reel 100, a loud sound can be clearly generated. Moreover, since, in the first drag member 61, the drag plate 66 and the sound generating ring 67 are disposed at intervals in the circumferential direction and in the axial direction, the sound generating ring 67 becomes more prone to vibration, and an even louder sound can be generated.

Accordingly, when the spool 12 rotates in the line releasing direction when catching a fish, a clear sound is generated, so that the fisherman can recognize the rotation of the spool, which is convenient for the fisherman. Additionally, since the sound generating ring 67 is not pressed even if the drag device 23 is activated, the generated sound will resonate well, and the volume will increase.

Meanwhile, the adjustment of the torque for rotating the spool 12, that is, the drag force, is carried out by changing the degree of pressure on the drive gear 31 by adjusting the pressing force of the disc spring 57 with the tightness of the star drag 3.

Other Embodiments

One embodiment of the present invention is described above, but the present invention is not limited to the above-described embodiment; various modifications can be made without departing from the scope of the invention. In particular, the plurality of embodiments and modified examples described in the present Specification can be freely combined according to necessity.

(a) in the above-described embodiment, a round metallic dual-bearing reel is described as an example, but the drag device of the present invention can be employed on all drag devices mounted to a drive shaft of a dual-bearing reel.

(b) In the above-described embodiment, a sound generating recess is exemplified as the impacted portion, but the impacted portion of the present invention is not limited to this structure. The impacted portion can be any configuration as long as the configuration allows the sound unit 64 to repeat the impact with the relative rotation of the sound generating ring 67 and the drive gear 31. For example, the impacted portion can have sound generating protrusions that are formed protruding in the circumferential direction at intervals. Additionally, the shape of the sound generating recess 67b is not limited to a wave shape, and this shape can be formed to be recessed, for example, in a spherical, triangular, or rectangular shape.

(c) In the above-described embodiment, the sound unit 64 is configured with a striking pin 70 and a biasing member 72, but the configuration of the sound unit 64 is not limited to this structure. The sound unit can be any configuration as long as the configuration is disposed on the handle side of the drive gear 31. For example, the sound unit can be a plate-like or a rod-like spring member that repeatedly impacts the sound generating part 67a by the relative rotation between the drive gear 31 and the drive shaft 30. The sound unit can also be formed by a pivoting pawl member that repeats the impact with the above-described relative rotation and a biasing member that biases the pawl member.

(d) In the above-described embodiment, the first drag member 61 is formed by two members, the drag plate 66 that has a pressing part 68c and a sound generating ring 67 that has the sound generating part 67a; however, the present invention is not limited to this structure. A pressing part and a sound generating part can be provided in one (e.g. second) drag member. In this configuration, since the sound generating part will be less prone to vibrate, there is the risk that the volume will be lower than in the above-described embodiment.

(e) In the above-described embodiment, a second drag member 62 and a third drag member 63 are provided in the drag device 23 in order to increase the transmitted torque, but these drag members do not have to be provided.

(f) In the above-described embodiment, one sound unit 64 is provided, but a plurality of sound units 64 (for example, two) can also be provided. In this configuration, a plurality of housing parts 35 can be provided, the housing parts 35 should be mounted to the mounting hole 31g, and the sound units 64 should be housed in these housing parts 35. In this configuration, each sound unit 64 can be made to emit sounds at different rotational phases. For example, the number of the sound generating recesses of the sound generating ring can be made to be a number that is not divisible by the number of the sound units. Also, the phases of the first engagement recess and the mounting hole can be changed to a position in which a plurality of sound units will not emit sounds at the same time. Accordingly, the sound emitting cycle of the sound unit will become short. Additionally, a plurality of sound units can be made to emit sounds simultaneously to increase the volume. In the above-described embodiment, since the housing part 35 and the drive gear 31 were provided separately, providing a plurality of sound units 64 as described above is possible.

(g) In the above-described embodiment, the housing part 35 that houses the sound unit 64 is separate from the drive gear 31, but the housing part can also be integral with the drive gear.

The above-described embodiment can be expressed as follows.

(A) The drag device 23 for a dual-bearing reel 100 is a device that regulates the relative rotation between a drive gear 31 that interlocks with a spool 12 and a drive shaft 30. The drag device 23 comprises a first drag member 61, a star drag 3, and a sound unit 64. The first drag member 61 is integrally rotatable with the drive shaft 30, is pressed against the drive gear 31, and has a sound generating part 67a that is formed on the pressing side with respect to the drive gear 31. The star drag 3 adjusts the pressing force of the first drag member 61. The sound unit 64 interlocks with the drive gear 31, is disposed so as to face the sound generating part 67a, and generates sound by interfering with the sound generating part 67a by the relative rotation between the drive gear 31 and the drive shaft 30.

In the drag device 23 for a dual-bearing reel 100, when a force that is stronger than the regulating force that is adjusted by the star drag 3 is applied to the fishing line, the spool 12 rotates in the line releasing direction, and the drag device 23 is activated. When the drag device 23 is activated, the drive shaft 30 and the drive gear 31 relatively rotate, and the sound unit 64 interferes with the sound generating part 67a to generate a sound. Here, since the sound generating part 67a is disposed on the pressing side of the first drag member 61 that presses the drive gear 31, the sound position by the interference between the sound unit 64 and the sound generating part 67a is a position that is closer to the second side cover 7, which is the outside surface of the dual-bearing reel 100, than the drive gear 31. For this reason, when the drag device 23 is activated, it is possible to generate a loud and clear sound.

(B) The sound unit 64 can also comprise a striking pin 70 that is mounted to the pressing side 31f of the drive gear 31 in order to freely move back and forth with respect to the sound generating part 67a and that can impact the sound generating part 67a, and a biasing member 72 that elastically biases the striking pin 70 toward the sound generating part 67a. In this configuration, since sound is generated by the striking pin 70 that is elastically biased toward the sound generating part 67a, it is possible to generate a crisp, clear sound.

(C) The sound generating part 67a can comprise at least one sound generating recess 67b. In this configuration, sound is generated by the striking pin 70 impacting the sound generating recess 67b by the relative rotation of the drive shaft 30 and the drive gear 31.

(D) The sound generating part 67a comprises a plurality of sound generating recesses 67b that are disposed at intervals in the circumferential direction. In this configuration, a plurality of sounds is generated with one rotation of the relative rotation of the drive shaft 30 and the drive gear 31. For this reason, a clear sound with more of a click feeling can be generated.

(E) The first drag member 61 can comprise a drag plate 66 that is integrally and rotatably mounted to the drive shaft 30 and that can press the drive gear 31 and a sound generating ring 67 that has a sound generating part 67a. In this configuration, since the first drag member 61 is formed by two members, a drag plate 66 for pressing the drive gear 31 and a sound generating ring 67 for emitting a sound during the drag operation, the sound generating ring 67 becomes prone to vibration while making sound. For this reason, an even louder and clearer sound can be generated during the drag operation.

(F) The drag plate 66 can have an engagement portion 68 that engages the sound generating ring 67, and the sound generating ring 67 can have an engaged portion 69 that engages with the drag plate 66. In this configuration, the drag plate 66 and the sound generating ring 67 can be integrally and rotatably coupled by engaging the engagement portion 68 and the engaged portion 69.

(G) A prescribed gap is between the engagement portion 68 and the engaged portion 9. In this configuration, since a prescribed gap is between the engagement portion 68 and the engaged portion 69, the sound generating ring 67 is more prone to vibration while making sound, and an even louder and clearer sound can be generated.

(H) The engagement portion 68 can comprise a first engagement section 68a that engages in the pressing direction and a second engagement section 68b that engages in the circumferential direction; the engaged portion 69 can comprise a first engaged section 69a that engages the first engagement section 68a and a second engaged section 69b that engages the second engagement section 68b. In this configuration, the sound generating ring 67 can be stopped by the engagement between the first engagement section 68a and the first engaged section 69a, and the sound generating ring 67 can be integrally and rotatably coupled with the drag plate 66 by the engagement between the second engagement section 68b and the second engaged section 69b.

The first engagement section 68a can comprise a pressing part 68c that protrudes in the pressing direction and a flange part 68d that extends from the pressing part 68c in the radial direction; the first engaged section 69a can comprise a through-hole 69c to which the pressing part 68c can be inserted and that is smaller in diameter than the flange part 68d. In this configuration, the pressing part 68c of the drag plate 66 can be inserted through the through-hole 69c and can press the drive gear 31, and the flange part 68d can stop the sound generating ring 67 in the periphery of the through-hole 69c.

The length L1 of the pressing part 68c in the pressing direction is longer than the length L2 of the through-hole 69c in the pressing direction. In this configuration, since the length L1 of the pressing part 68c in the pressing direction is longer than the length L2 of the through-hole 69c, a gap can be formed between the drag plate 66 in the pressing direction of the sound generating ring 67. Accordingly, the sound generating ring 67 is prone to vibration while making sound, and an even louder and clearer sound can be generated during the drag operation.

The length L1 of the pressing part 68c in the pressing direction can be at least 0.1 mm longer than the length L2 of the through-hole 69c in the pressing direction. In this configuration, since the length L1 of the pressing part 68c is only slightly longer with respect to the length L2 of the through-hole 69c, there will not be an increase in the size of the dual-bearing reel even if the length L1 of the pressing part 68c is made to be longer than the through-hole 69c.

The second engagement section 68b can be at least one second engagement recess 68e that is disposed in the circumferential direction of the drag plate 66, and the second engaged section 69b can be a second engagement protrusion 69d that can engage the second engagement recess 68e. In this configuration, the sound generating ring 67 can be integrally and rotatably coupled to the drag plate 66 with the concave-convex engagement.

The second engagement section 68b can be a plurality of second engagement recesses 68e that are disposed at intervals in the circumferential direction of the drag plate 66, and the second engaged section 69b can be a plurality of second engagement protrusions 69d that can engage the plurality of the second engagement recesses 68e. In this configuration, the sound generating ring 67 can be securely coupled integrally and rotatably to the drag plate 66 with the plurality of concave-convex engagements.

The length L4 of the second engagement protrusion 69d in the circumferential direction can be shorter than the length L3 of the second engagement recess 68e in the circumferential direction. In this configuration, since a gap in the circumferential direction is formed between the second engagement protrusion 69d and the second engagement recess 68e, the sound generating ring 67 is more prone to vibration while making sound, and an even louder and clearer sound can be generated.

The length L4 of the second engagement protrusion 69d in the circumferential direction is at least 0.1 mm shorter than the length L3 of the second engagement recess 68e in the circumferential direction. In this configuration, since the gap between the second engagement protrusion 69d and the second engagement recess 68e in the circumferential direction is small, when the drag device 23 is activated, the sound generating ring 67 and the drive gear 31 that interlocks with the sound unit 64 will relatively rotate instantaneously. Accordingly, a sound will be instantaneously emitted when the drag device 23 is activated.

What is claimed is:

1. A drag device for a dual-bearing reel for regulating the relative rotation between a drive gear that interlocks with a spool and a drive shaft, the drag device comprising:
    a drag member configured to be integrally rotatable with the drive shaft, including a pressing side configured to be pressed against the drive gear, and having a sound generating part on the pressing side;
    a drag adjustment part configured to adjust a pressing force of the drag member; and
    a sound unit configured to interlock with the drive gear, being disposed so as to face the sound generating part, and being configured to generate sound by interfering with the sound generating part by relative rotation between the drive gear and the drive shaft.

2. The drag device for a dual-bearing reel recited in claim 1, wherein
    the sound unit comprises a striking pin configured to be mounted to a pressing side of the drive gear so as to be freely moveable back and forth with respect to the sound generating part and to impact the sound generating part, and a biasing member configured to elastically bias the striking pin toward the sound generating part.

3. The drag device for a dual-bearing reel recited in claim 2, wherein
    the sound generating part comprises at least one impacted portion.

4. The drag device for a dual-bearing reel recited in claim 3, wherein
    the at least one impacted portion is one of a plurality of impacted portions disposed at intervals in a circumferential direction.

5. The drag device for a dual-bearing reel recited in claim 1, wherein
    the drag member comprises a drag plate configured to be integrally mounted on the drive shaft so as to be rotatable and is configured to press the drive gear, and a sound generating ring includes the sound generating part.

6. The drag device for a dual-bearing reel recited in claim 5, wherein
the drag plate comprises an engagement portion configured to engage the sound generating ring, and
the sound generating ring comprises an engaged portion configured to engage the drag plate.

7. The drag device for a dual-bearing reel recited in claim 6, wherein
the engagement portion and the engaged portion are disposed so as to have a prescribed gap therebetween.

8. The drag device for a dual-bearing reel recited in claim 6, wherein
the engagement portion comprises
a first engagement section configured to engage in a pressing direction,
and a second engagement section configured to engage in a circumferential direction, and
the engaged portion comprises
a first engaged section configured to engage the first engagement section, and
a second engaged section configured to engage the second engagement section.

9. The drag device for a dual-bearing reel recited in claim 8, wherein
the first engagement section comprises a pressing part protruding in the pressing direction, and a flange part extending radially from the pressing part, and
the first engaged section comprises a through-hole configured to receive the pressing part and having a diameter that is smaller than a diameter of the flange part.

10. The drag device for a dual-bearing reel recited in claim 9, wherein
the pressing part has a length in the pressing direction that is longer than a length of the through-hole in the pressing direction.

11. The drag device for a dual-beating reel recited in claim 10, wherein
the length of the pressing part in the pressing direction is at least 0.1 mm longer than the length of the through-hole in the pressing direction.

12. The drag device for a dual-bearing reel recited in claim 8, wherein
the second engagement section is at least one engagement recess disposed in the circumferential direction of the drag plate, and
the second engaged section is an engagement protrusion configured to engage the engagement recess.

13. The drag device for a dual-bearing reel recited in claim 12, wherein
the second engagement section includes a plurality of engagement recesses disposed in the circumferential direction of the drag plate at intervals, and
the second engaged section includes a plurality of engagement protrusions configured to engage the plurality of engagement recesses.

14. The drag device for a dual-bearing reel recited in claim 12, wherein
the engagement protrusion has a length in the circumferential direction that is shorter than a length of the engagement recess in the circumferential direction.

15. The drag device for a dual-bearing reel recited in claim 14, wherein
the length of the engagement protrusion in the circumferential direction is at least 0.1 mm shorter than the length of the engagement recess in the circumferential direction.

* * * * *